US006434254B1

(12) United States Patent
Wixson

(10) Patent No.: US 6,434,254 B1
(45) Date of Patent: Aug. 13, 2002

(54) METHOD AND APPARATUS FOR IMAGE-BASED OBJECT DETECTION AND TRACKING

(75) Inventor: Lambert Ernest Wixson, Rocky Hill, NJ (US)

(73) Assignee: Sarnoff Corporation, Princeton, NJ (US)

( * ) Notice: Subject to any disclaimer, the term of this patent is extended or adjusted under 35 U.S.C. 154(b) by 844 days.

(21) Appl. No.: 08/742,432

(22) Filed: Oct. 30, 1996

Related U.S. Application Data

(60) Provisional application No. 60/006,098, filed on Oct. 31, 1995.

(51) Int. Cl.[7] .................................................. G06K 9/00
(52) U.S. Cl. ....................... 382/103; 382/107; 382/123; 382/270; 348/4.16; 348/142; 348/152-154; 348/169; 348/122; 348/174
(58) Field of Search ................................ 382/103, 107, 382/173, 270; 348/142, 152, 154, 155, 169, 416, 701, 700, 699, 122, 143

(56) References Cited

U.S. PATENT DOCUMENTS

| 4,959,714 A | 9/1990 | Lo et al. ...................... 358/125 |
| 5,218,414 A | 6/1993 | Kajiwara ........................ 356/1 |
| 5,243,418 A | * 9/1993 | Kuno et al. ................... 382/107 |
| 5,267,329 A | 11/1993 | Ulich et al. .................... 382/48 |
| 5,606,376 A | * 2/1997 | Shinohara ................... 348/701 |

OTHER PUBLICATIONS

M. Kilger, "A Shadow Handler in a Video-based Real-time Traffic Monitoring System", IEEE Workshop on Application of Computer Vision, pp. 11–18, 1992.

D. Koller, J. Weber, J. Malik, "Robust Multiple Car Tracking with Occlusion Reasoning", European Conference on Computer Vision, 1994, pp. 189–196.

Copy of International Search Report dated Mar. 4, 1997, from corresponding international application PCT/US96/17504.

* cited by examiner

Primary Examiner—Andrew W. Johns
Assistant Examiner—Hieu Le
(74) Attorney, Agent, or Firm—William J. Burke

(57) ABSTRACT

A method and apparatus for detecting objects from a sequence of images of a scene containing an object by using two distinct methods for object detection. One is suited for well-lit scenes (e.g., daytime), while the other is suitable for poorly-lit scenes (e.g., nighttime) where the objects have lights mounted on them. Further, the method and apparatus are adaptive to the image statistics of the objects being detected, and can be programmed to filter out "weak" detections that lie below a certain percentile in the observed statistical distribution of image measures. The specific percentile is determined based on whether the scene has been determined to be well- or poorly-lit and whether it contains shadows or not.

17 Claims, 2 Drawing Sheets

METHOD AND APPARATUS FOR IMAGE-BASED OBJECT DETECTION AND TRACKING

This patent application claims benefit of U.S. provisional patent application Ser. No. 60/006,098 filed Oct. 31, 1995.

The invention relates to image processing techniques and, more particularly, to a method and apparatus for detecting and tracking objects within a sequence of images.

BACKGROUND OF THE DISCLOSURE

Many computer vision systems for automatic surveillance and monitoring seek to detect and segment transitory objects that appear temporarily in the system's field of view. Examples include traffic monitoring applications that count vehicles and automatic surveillance systems for security. These systems often require different object detection and segmentation methods depending on the ambient conditions. An example of such a system is disclosed in U.S. patent application Ser. No. 08/372,924 filed Jan. 17, 1995, the disclosure of which is incorporated herein by reference.

To be effective, an image based surveillance or monitoring system must delineate or segment individual objects that appear in the field of view of an imaging device, e.g., video camera that produces one or more images of a scene within the field of view. Often the object segmentation task is accomplished by examining the difference between a current image and a "reference" image that contains only the static background of the scene. The reference image can be thought of as a representation of the scene as it would appear if no transitory objects were in view. However, such simple image differencing techniques are often insufficient for accurate segmentation, especially in the presence of common illumination artifacts. Two such artifact types are shadows cast by objects in or near the scene, and reflections from lights mounted on objects within the scene. For example, in the application domain of video vehicle detection, it is common to have difficulty delineating objects accurately and/or to detect false objects when vehicles are casting shadows or when bright reflections from headlights or taillights are present.

Previous efforts have attempted to avoid the problems of false object detection due to shadows and headlight reflections by establishing parameters of object detection in such a way that these illumination artifacts do not trigger an object detector. Unfortunately, it is very difficult to find simple absolute thresholds that achieve this goal and do not miss objects for all imaging conditions (e.g., day/night, bright/hazy days, dusk, rain and the like). As a result, object detection is not as sensitive as desired and the system fails to detect a significant number of objects.

Therefore, a need exists in the art for an improved method and apparatus for detecting and tracking objects within a scene and, particularly, in a scene containing shadows and headlight reflections.

SUMMARY OF THE INVENTION

The invention is a method and apparatus for detecting objects from a sequence of images of a scene containing an object by using two distinct methods for object detection. One is suited for well-lit scenes (e.g., daytime), while the other is suitable for poorly-lit scenes (e.g., nighttime) where the objects have lights mounted on them. Further, the method and apparatus of the invention are adaptive to image statistics regarding the objects being detected, and can be programmed to filter out "weak" detections that lie below a certain percentile in an observed statistical distribution of image measures. The specific percentile is determined based on whether the scene has been determined to be well- or poorly-lit and whether the scene contains shadows or not.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
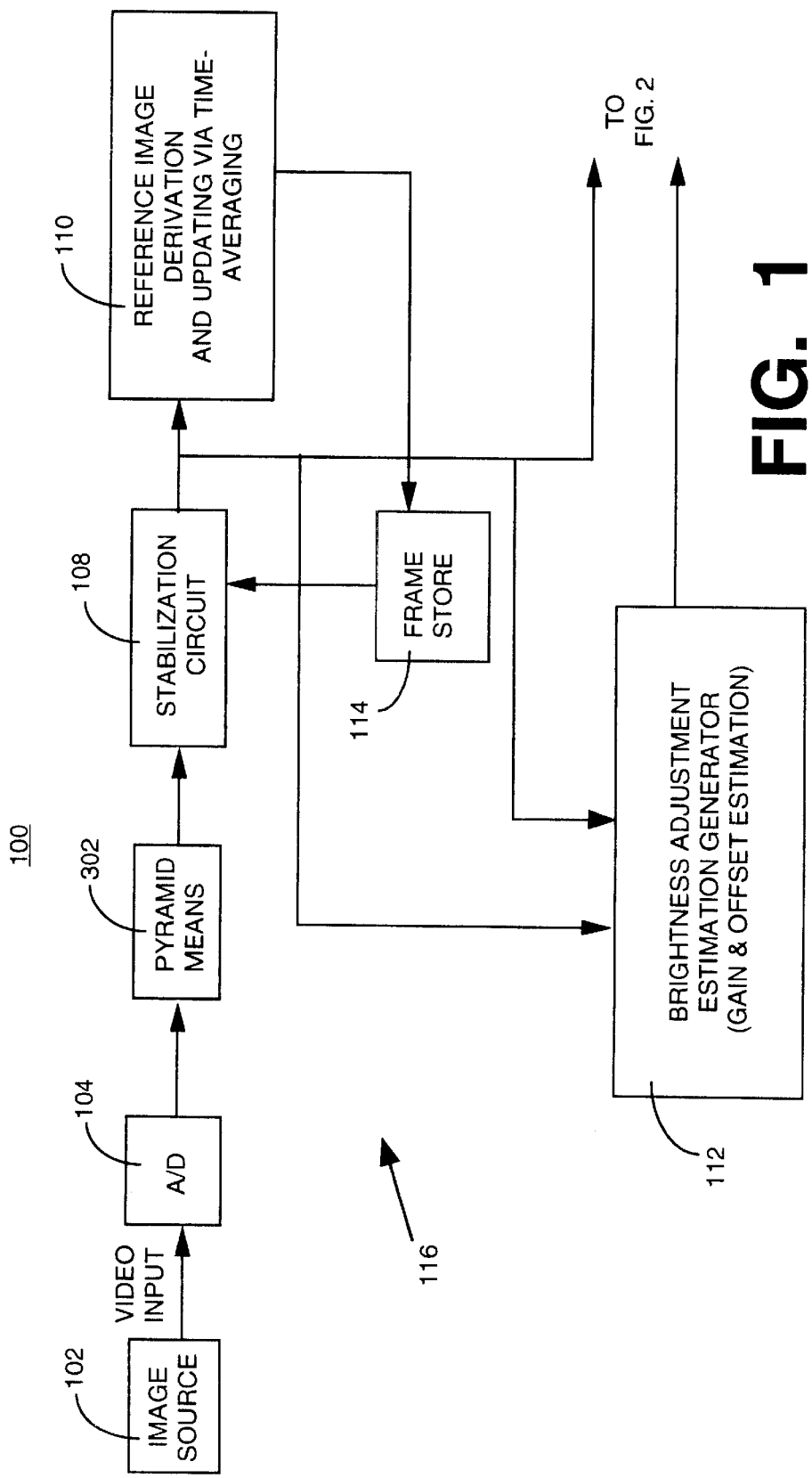
FIG. 1 is a functional block diagram of the preprocessing portion of the image processor of the invention.

The invention is a method and apparatus for detecting objects within a scene represented by a sequence of images. The invention uses two distinct methods for detection. One is suited for well-lit scenes (e.g., daytime), while the other is suitable for poorly-lit scenes (e.g., nighttime) where the objects have lights mounted on them. Further, each of the detection methods are adaptive to image statistics regarding objects being detected, and can be programmed to filter out "weak" detections that lie below a certain percentile in the observed statistical distribution of image measures. The specific percentile is determined based on whether an external module has determined the scene to be well- or poorly-lit and whether it contains shadows or not.

Object detection is based on two image measures which are computed at each pixel using neighboring pixels within a limited area, defined by a window function $W(x,y)$. That is, $W(x,y)$ represents a function producing a set of pixels which are taken to be the "neighbors" of pixel $(x, y)$.

The first image measure is the brightness. This is simply the average of the intensities within the window and is defined for a pixel $(x,y)$ in an image G as $$\text{brightness}(G, x, y) = \frac{\sum_{(x',y') \in W(x,y)} G(x', y')}{\|W(x, y)\|}.$$

where $\|W(x,y)\|$ is the cardinality of the pixel set produced by the window function.

The second image measure is the energy, which can be thought of as a measure of the intensity variation among nearby pixels. In practice, the following energy measure is used, but others can be used as well:

$$\text{energy}(G, x, y) = \frac{\sum_{(x',y') \in W(x,y)} |G(x', y') - G(x' - 1, y')|}{\|W(x, y)\|}$$

The size of the set produced by the neighborhood function W may vary with pixel location $(x,y)$ or may be a fixed size independent of location. By using a window function W that varies with pixel location, computational efficiency may be achieved.

In a traffic monitoring implementation, $W(x,y)$ is defined to be the empty set for all pixel sites except those overlooking the center of each traffic lane to be monitored. At a pixel (x,y) overlooking the center of a lane, W(x,y) is defined to be all pixels on image row y which image part of the lane. That is, the function W is taken to be a set of adjacent pixels on row y, centered on (x,y), that spans the traffic lane. (This set is specified by the user via a graphical interface that allows the user to mark the lane boundaries.) By defining W in this way, it is only necessary to compute the brightness and energy at those image locations which are centered on a traffic lane. This also reduces the two-dimensional (2D) imagery to a single brightness and energy value per image row of each lane. In effect, this reduces the 2D image representation to a one-dimensional (1D) strip representation, with one 1D strip for each lane.

The detection methods of the invention that follow apply equally to either a 2D or 1D representation, with the exception of the detection method for poorly-lit scenes. That method does rely on the 1D representation.

Figure 2:
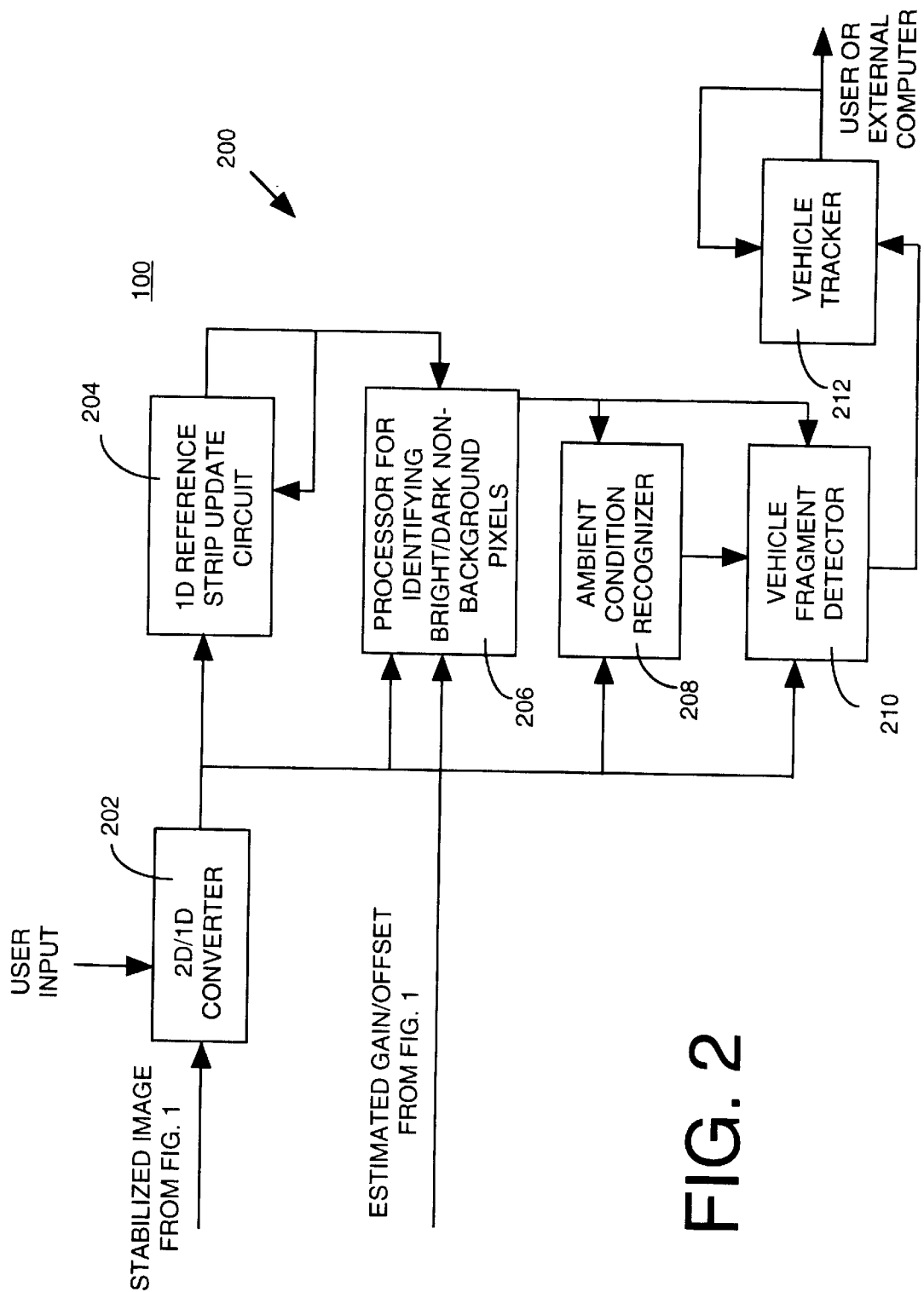
FIG. 2 is a functional block diagram of the detection and tracking portion of the image processor of the invention.

FIGS. 1 and 2 together depict a block diagram of an object tracking system 100 (e.g., a vehicle tracking system) that forms one illustrative embodiment of the present invention. Generally speaking, digitized video enters the system 100 and undergoes low-level preprocessing to reduce the image resolution, stabilize the image, generate and/or update a 2D reference image using simple time-averaging, and estimate the gain and offset that maps intensities in the 2D reference image to the current image. The current image is then passed through a 2D-to-1D converter that reduces the user-delineated traffic lanes to 1D strips for which both brightness and energy are stored for each location on the strip.

These 1D strips are passed through a reference image construction module that, over multiple images, constructs a 1D reference strip for each defined strip. This construction is performed using the techniques described in U.S. provisional patent application serial No. 60/006,104 filed Oct. 31, 1995, now U.S. Pat. No. 5,963,292 entitled "METHOD FOR CONSTRUCTING A REFERENCE IMAGE FROM AN IMAGE SEQUENCE" filed concurrently herewith and incorporated herein by reference. That disclosure presents the general form for 2D reference images, but it specializes to 1D straightforwardly. These reference strips, together with the input strips, are also passed to a module which identifies pixels which do not match the reference strip and further classifies them as "bright" or "dark". The measures computed in this step are used both by an ambient condition recognizer and a vehicle fragment detector. The ambient condition recognizer determines whether the scene is well- or poorly-lit, whether shadows are present, or whether the scene is too hazy to perform effective detection. The ambient condition recognizer is disclosed in U.S. Pat. No. 6,037,976 entitled "METHOD AND APPARATUS FOR DETERMINING AMBIENT CONDITIONS FROM AN IMAGE SEQUENCE" filed concurrently herewith.

Assuming effective detection can be performed, the input strip values, the bright/dark non-background pixel information, and the determined ambient conditions are sent to a vehicle fragment detector, which employs the methods of the present invention. The detected vehicle fragments are then sent to a tracking module which tracks vehicles over time. Upon detecting a new fragment which cannot be associated with an existing vehicle, the system generates a new vehicle representation for that fragment. The vehicle representations gathered by the tracker are then output to the user or an external computer.

Referring to FIG. 1, there is shown a functional block diagram of a preprocessor portion 116 of the digital traffic-monitoring image processor system 100. Portion 116 contains an analog-to-digital (A/D) converter 104, a pyramid processor 106, a stabilization circuit 108, a reference image generator 110, a frame store 114 and a brightness adjustment estimation generator 112.

The analog video signal input from an image source 102 (e.g., a camera, video cassette recorder (VCR), video disk player, infrared camera and the like), after being digitized by the A/D converter 104, is decomposed into a specified number of Gaussian pyramid levels by the pyramid processor 106 for reducing pixel density and image resolution. The pyramid processor 106 is not essential, since the vehicular traffic system within which this invention may operate could be operated at the resolution of the 640×480 pixel density of the video source, e.g., video camera. However, because this resolution is higher than is needed downstream for the present vehicular traffic system, the use of the pyramid processor 106 increases the system's computational efficiency. Not all levels of the pyramid must be used in each computation. Further, not all levels of the pyramid need be stored between computations, as higher levels can always be computed from lower ones. However, for illustrative purposes it is assumed that all of the specified number of Gaussian pyramid levels are available for each of the downstream computations discussed below.

The first of these downstream computations is performed by the stabilization circuit 108. Stabilization circuit 108 employs electronic image stabilization to compensate for the problem of camera motion. Camera motion causes pixels in the image to move. Stabilization circuit 108 compensates for image translation from image to image that is due to camera rotation about an axis perpendicular to the field of view. The compensation is achieved by shifting the current image an integer number of rows and columns so that, despite camera sway, the image remains fixed in alignment to within one pixel with a reference image derived by the generator 110 and stored within the frame store 114. The required shift is determine by locating two known landmark features in each image via a matched filter within the stabilization means. The problem of "camera-induced image intensity changes (due to camera auto-iris and auto-gain)" interfering with object detection is overcome by the cooperative operation of the reference image generator 110, the frame store 114 and the brightness adjustment estimation generator 112. Generator 100 performs a recursive temporal filtering operation on each corresponding pixel of the images of successive stabilized image images applied as an input thereto from circuit 108. The reference image is stored after each frame in the frame store 114. The output of the stabilization circuit 108 and the brightness adjustment estimation generator 112 is forwarded to the detection and tracking portion 200 of the traffic-monitoring image processor shown in FIG. 2.

Referring to FIG. 2, there is shown a 2D/1D converter 202, a 1D reference strip update circuit 204, a processor for identifying non-background pixels 206, an ambient condition recognizer 208, a vehicle fragment detector 210 and a vehicle tracker 212.

2D/1D converter 202 operates to convert two dimensional (2D) stabilized image information received from FIG. 1 that is applied as a first input thereto into one dimensional (1D) image information in accordance with user control information applied as a second input to the converter 202. 2D/1D converter 202 operates to convert 2D image information into 1D image information in accordance with user control information applied as a second input thereto. More specifically, computation by converter 202 involves employing each of pixel positions (x,y) to define integration windows. For example, such a window might be either (a) all image pixels on row y that are within the delineated lane bounds of a roadway, (b) all image pixels on column x that are within the delineated lane bounds, or (c) all image pixels on a line perpendicular to the tangent of the medial strip of a roadway at position (x,y). Other types of integration windows not described here may also be used.

The first step prior to detection is to classify each pixel as "background" or "non-background" by comparing each pixel against the image measures for the corresponding pixel in the reference image, and to further classify each non-background pixel as either "bright" or "dark" depending on its brightness relative to that of the reference image. While this method is general for 2D imagery, in practice it operates on a 1D strip and pixels can be represented with a single coordinate.

Given a current image I and the reference image R, corresponding pixels in the two images are compared in processor 206 to decide whether they are roughly identical, e.g., to produce a difference image. Identical pixels are labeled as "background", while non-identical pixels are labeled as "non-background". Determining whether pixels are identical is complicated by the fact that the current image may have undergone a global intensity change due to operation of the camera's auto-iris. A pre-processing step (112 of FIG. 1) estimates a global gain g and offset o that describes the relationship between R and I. Given these estimates, a procedure executed by processor 206 for determining whether a pixel (x,y) is identical in the two images is:

1. Compute the brightness difference bdiff(x,y), where bdiff(x,y)=brightness(I,x,y)−g×brightness(R,x,y)−o.
2. Compute the energy difference ediff(x,y), where ediff(x,y)=|energy(I,x,y)−g×energy(R,x,y)|.
3. IF ediff(x,y)<$K_1$×energy(R,x,y)+$K_2$×∥W(x,y)∥ AND |bdiff(x,y)|<$K_3$×∥W(x,y)∥,
   THEN Label (x,y) as "background".
   ELSE Label (x,y) as "non-background".
4. IF (x,y) was labeled as "non-background",
   THEN IF bdiff(x,y)≧0
   THEN Label (x,y) as "bright".
   ELSE Label (x,y) as "dark".

Steps 1 and 2 compute the differences, weighting the reference image measures using the estimated gain and offset. Step 3 presents two conditions, one on the energy difference and one on the brightness difference, that must both be met in order to decide that the object is background. $K_1$ is a constant between 0 and 1 that dictates how much of an energy difference, relative to the reference value, the user is willing to tolerate. In practice, $K_1$ is set to approximately 0.2. $K_2$ and $K_3$ are constants that indicate the user's estimate of the amount of measurement noise (e.g. due to digitizer error) that is likely to occur for each pixel. Since these are per-pixel estimates they are multiplied by the number of pixels in the window that is used to compute the brightness and energy. In practice, $K_2$ is set to approximately 1 and $K_3$ is set to 12.

This background/non-background classification process correctly classifies objects as non-background, but will also incorrectly classify illumination artifacts such as shadows and light reflections as non-background. Therefore, additional filtering mechanisms are needed to effectively detect only true objects. The filtering mechanisms which will be described here are based on comparing image energy against certain threshold values. But since absolute threshold values will vary with the illumination and weather conditions, the thresholds need to be based on measures which tend to be more robust. Ambient condition recognizer 208 provides information from the sequence of images concerning the ambient conditions. Recognizer 208 is more fully described in U.S. provisional patent application serial No. 60/006,100 filed Oct. 31, 1995, now U.S. Pat. No. 6,037,976 entitled "METHOD AND APPARATUS FOR DETERMINING AMBIENT CONDITIONS FROM AN IMAGE SEQUENCE" filed concurrently herewith. Preferably the thresholds are expressed in terms of percentiles of the observed statistical distribution of the energy measure. For example, in shadow conditions, a threshold is set that discards those 30% of the dark pixels with the weakest ediff measure.

In order to select thresholds based on percentiles, the system must maintain a record of the image energy statistics over a recent time period. In practice, this is typically the last 2 minutes. For every pixel at which temporal change (i.e., relative to the previous frame) is detected and which is classified as non-background, the system records the pixel's ediff value and stores it in a histogram data structure. Conditioning storage in the histogram on seeing temporal change at the pixel ensures that objects such as vehicles that come to a temporary stop in the field of view will not unduly weight the histogram. Energy values from non-background pixels classified as "bright" are stored in one histogram, while energy values from non-background pixels classified as "dark" are stored in a second histogram. Once the sampling time period has elapsed, the two histograms are termed the "observed histograms" (denoted $Hist_{bright}$ and $Hist_{dark}$), the previous "observed histograms" are discarded, and construction of two new histograms is begun for the next sampling time period.

The detection method that is used when the scene has been determined by ambient condition recognizer 208 to be well-lit operates by selecting energy thresholds, based on fixed percentages of the observed statistical distribution of non-background energy values, and using these energy thresholds to further prune the non-background pixels. Pixels with sufficiently high energy to pass this pruning are labeled "object" pixels, and are then grouped together into regions called "object fragments" using a connected-components procedure.

The central idea here is that non-background pixels belonging to objects typically have higher energy than non-background pixels which are caused by illumination artifacts. Different energy thresholds are used for bright and dark non-background pixels, due to the fact that some illumination artifacts, such as shadows, can only be darker than the background, and not brighter.

Specifically, the detection method for well-lit scenes operates as follows:

1. Select two percentages $P_{bright}$ and $P_{dark}$ between 0 and 100. These percentages should be selected based on whether the scene has been determined by the ambient condition recognizer 208 to contain shadows or not. In practice, for scenes with shadows, $P_{bright}$ is set to 10% and $P_{dark}$ is set to 30%. For scenes without shadows, $P_{bright}$ is set to 10% and $P_{dark}$ is set to 0%.
2. Using the data gathered in $Hist_{bright}$) select an energy threshold $En_{bright}$ such that $P_{bright}$ percent of the observed samples in $Hist_{bright}$ have energy values less than $En_{bright}$.
3. Using the data gathered in $Hist_{dark}$, select an energy threshold $En_{dark}$ such that $P_{dark}$ percent of the observed samples in $Hist_{dark}$ have energy values less than $En_{dark}$.
4. For each bright non-background pixel (x,y): IF ediff (x,y)≧$En_{bright}$
   THEN Label pixel (x,y) as "object".
   ELSE Label pixel (x,y) as "non-object".

5. For each dark non-background pixel (x,y): IF ediff(x, y)≧En$_{dark}$
   THEN Label pixel (x,y) as "object".
   ELSE Label pixel (x,y) as "non-object".
6. Using a connected-components procedure, identify sets of adjacent pixels which are labeled as "object". Each such set is termed a "vehicle fragment."

In poorly-lit scenes, the method for traffic surveillance relies on the fact that vehicles carry lights (i.e. headlights and taillights) to detect them. Unfortunately, these lights reflect off the road surface and these reflections can be easily mistaken for objects. Therefore additional complexity must be added to the detection method in such scenes. The method uses the fact that the lights on objects will usually be local brightness maxima and will usually contain a sharp change in brightness between the light and the road. The method for processing each 1D strip is as follows:

1. Locate strip pixels x which were classified as bright non-background and which are local brightness maxima (i.e. such that brightness(x−1)<brightness(x) and brightness(x+1)<brightness(x)). Such pixels will be termed seeds.
2. Starting from each seed, perform region growing in each direction along the strip until reaching a pixel which was classified as non-background or whose brightness exceeds the preceding pixel by more than some fixed percentage. (In practice, 5% is usually sufficient.) This yields a 1D region of adjacent pixels.
3. Within the region, test all the pixels within 4 pixels of the seed (a subregion) to see whether there is a brightness change between adjacent pixels that exceeds some fixed percentage (typically 15%) of the brightness at the seed. If so, then label this region as a "vehicle fragment". If not, then discard it.

Fragment detector 210 extracts vehicle fragments from each image and tries to match them against known vehicles which have been tracked in previous images. If a new fragment appears which cannot be matched to a known vehicle, the system generates a new "vehicle" representation which will be tracked over images by tracker 212.

It is not uncommon for single vehicles to be detected as multiple fragments in the image. When a new fragment appears in close proximity to another known vehicle, the new fragment is merged into the existing vehicle representation.

In a traffic monitoring application, vehicles are tracked from image to image. Tracking is useful for several reasons. First, sometimes false vehicles may be detected due to changing light levels in the scene. If a detected vehicle never moves, however, this is a good indication that it is not really a vehicle, and should be ignored. Second, tracking vehicles enables the system to detect which vehicles have been detected in previous images, and which ones are new. This enables accurate counting of vehicles. Finally, tracking vehicles enables the system to estimate their speed.

Each vehicle is tracked by using the position of its fragments in previous images to estimate its velocity and then using this velocity to predict how far it will move. The velocity may be estimated in image coordinates (i.e., pixels/second), or if camera calibration information is available, in ground coordinates (e.g. feet/second).

It is to be understood that the apparatus and method of operation taught herein are illustrative of the invention. Modifications may readily be devised by those skilled in the art without departing from the spirit or scope of the invention. The invention can be used as part of a surveillance or monitoring system. While the methods and apparatus of the invention have been principally described in terms of a traffic monitoring system, it is clear that it can also be used in other applications where detection and monitoring of objects is sought.

What is claimed is:

1. A method of identifying and tracking objects within a scene represented by a sequence of images comprising the steps of:
   generating a reference image containing background information of the scene;
   selecting an image from said sequence of images as a two dimensional object image;
   converting said two dimensional object image into a one-dimensional strip of object image values;
   converting said reference image into a one-dimensional reference strip of reference values;
   producing a difference strip of difference values by comparing the reference values in the reference strip to the object image values in the one-dimensional strip; and
   processing said difference strip to identify moving objects in said scene.

2. The method of claim 1 wherein said processing step further comprises the steps of:
   classifying each difference value in said difference strip as either background or non-background.

3. The method of claim 1 wherein said producing step comprises the steps of:
   generating a brightness difference value for each object image value in said one-dimensional strip by computing a reference brightness value for each reference value in said reference strip, computing an object image brightness value for each object image value in said one dimensional strip, and comparing each of said reference brightness values to each corresponding object image brightness value;
   generating an energy difference value for each object image value in said one-dimensional strip by computing a reference energy value for each reference value in said reference strip, computing an object image energy value for each object image value in said one dimensional strip, and comparing each said reference energy value to each corresponding object image energy value; and
   comparing the brightness difference value to a brightness difference threshold value and the energy difference value to a energy difference threshold value to classify each object image value as either background or non-background values.

4. The method of claim 3 further comprising the steps of:
   determine each bright non-background object image value in said one dimensional strip having a brightness maxima;
   identifying a brightness region of object image values adjacent to each object image value being a brightness maxima;
   determining a brightness change within a subregion of each region, if a change in object image value brightness between adjacent object image values that is greater than a predefined threshold occurs, label the subregion values an object.

5. The method of claim 4 further comprising the step of detecting a lack of motion of a previously detected object to identify a falsely detected object.

6. The method of claim 3 wherein said producing step further comprises the steps of:

for each object image value that is classified as a non-background value, comparing the brightness difference value to a second brightness threshold value to classify the object image value as either bright or dark.

7. The method of claim 6 further comprising the steps of:

comparing the object image energy value of each of the bright non-background object image values to an energy threshold value;

discarding each bright non-background object image value that has an object image energy value that is less than the energy threshold value; and identifying remaining pixels as object pixels.

8. The method of claim 7 further comprising the steps of:

tracking the object using predictive estimation of object position.

9. The method of claim 7 wherein the energy threshold value is determined by computing a statistical distribution of energy levels for the object image energy values.

10. The method of claim 7 further comprising the step of detecting a lack of motion of a previously detected object to identify a falsely detected object.

11. The method of claim 8 further comprising the step of detecting a lack of motion of a previously detected object to identify a falsely detected object.

12. A method of identifying and tracking objects within a scene represented by a sequence of images comprising the steps of:

generating a reference image containing background information of the scene;

selecting an image from said sequence of images as an object image;

generating a brightness difference value for each pixel in said object image by computing a reference brightness value for each reference pixel in said reference image, computing an image brightness value for each pixel in said object image, and comparing each of said reference brightness values to each corresponding image brightness value;

generating an energy difference value for each pixel in said object image by computing a reference energy value for each reference pixel in said reference image, computing an image energy value for each pixel in said object image, and comparing each said reference energy value to each corresponding image energy value;

comparing the brightness difference value to a brightness difference threshold value and the energy difference value to a energy difference threshold value to classify each pixel in said object image as either background or non-background values; and for each object image value that is classified as a non-background value, comparing the brightness difference value to a second brightness threshold value to classify each non-background pixel as bright or dark; and processing each bright non-background pixel to determine if the pixel is an object.

13. The method of claim 12 further comprising the steps of:

comparing an energy value of each of the bright non-background pixels to an energy threshold value;

discarding each bright non-background pixel that does not meet the energy threshold value; and identifying remaining pixels as object pixels.

14. The method of claim 12 wherein said reference image is a one dimensional reference strip and said object image is a one dimensional object image strip.

15. Apparatus for identifying and tracking objects within a scene represented by a sequence of images comprising:

a reference image generator for generating a reference image containing background information of the scene;

an image processor, coupled to said reference image generator, for selecting an image from said sequence of images as an object image for generating a brightness difference value for each pixel in said object image by computing a reference brightness value for each reference pixel in said reference image, computing an image brightness value for each pixel in said object image, and comparing each of said reference brightness values to each corresponding image brightness value, generating an energy difference value for each pixel in said object image by computing a reference energy value for each reference pixel in said reference image, computing an image energy value for each pixel in said object image, and comparing each said reference energy value to each corresponding image energy value, comparing the brightness difference value to a brightness difference threshold value and the energy difference value to a energy difference threshold value to classify each pixel in said image as either background or non-background values comparing an energy value of each of the non-background pixels to an energy threshold; discarding each non-background pixel that does not meet the threshold; and an object detector, coupled to said image processor, for processing each bright non-background pixel to determine if the pixel is an object.

16. The apparatus of claim 15 wherein the threshold is determined by computing a statistical distribution of energy levels.

17. The apparatus of claim 15 wherein each image in said sequence of images is a one dimensional strip representation of a two-dimensional image, and said reference image is a one-dimensional reference image.

* * * * *